Oct. 18, 1949.  T. O. WENTWORTH  2,484,918
LIQUID-VAPOR CONTACT APPARATUS
Original Filed Feb. 10, 1942  2 Sheets-Sheet 1
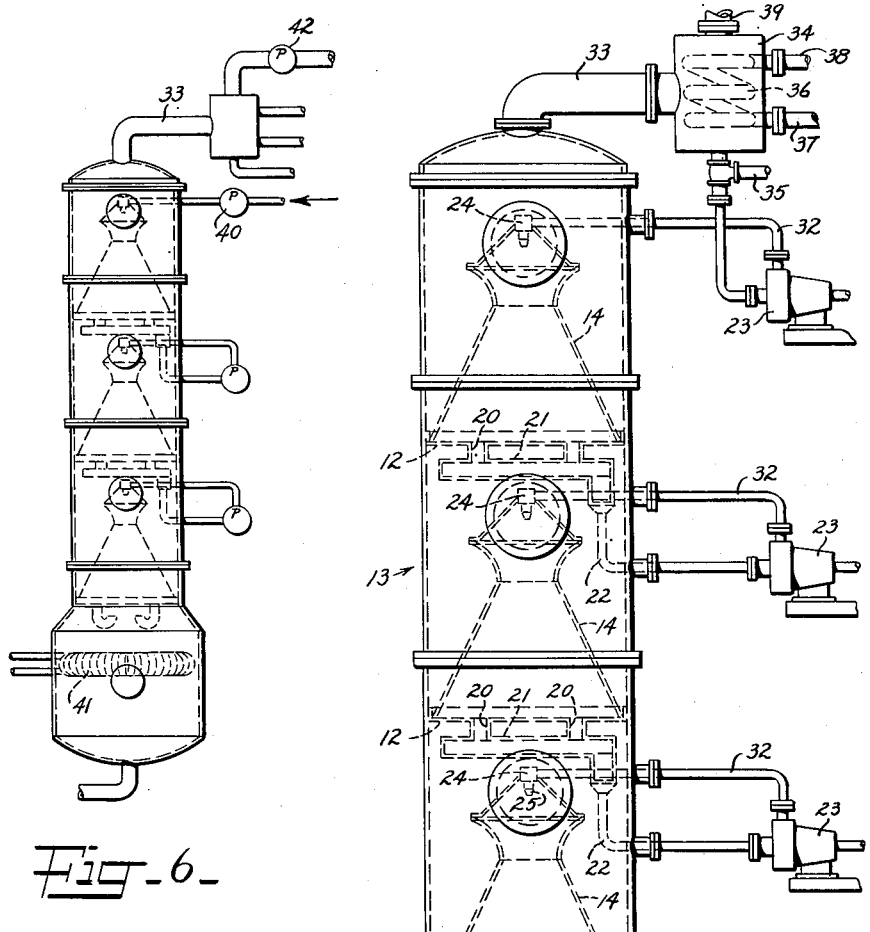
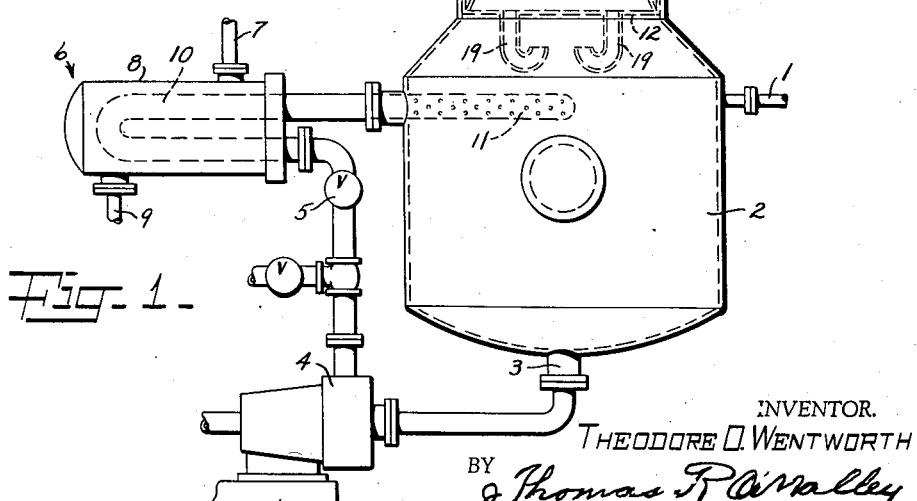
INVENTOR.
THEODORE O. WENTWORTH
BY Thomas R. O'Malley
ATTORNEY Oct. 18, 1949.    T. O. WENTWORTH    2,484,918
LIQUID-VAPOR CONTACT APPARATUS
Original Filed Feb. 10, 1942    2 Sheets-Sheet 2
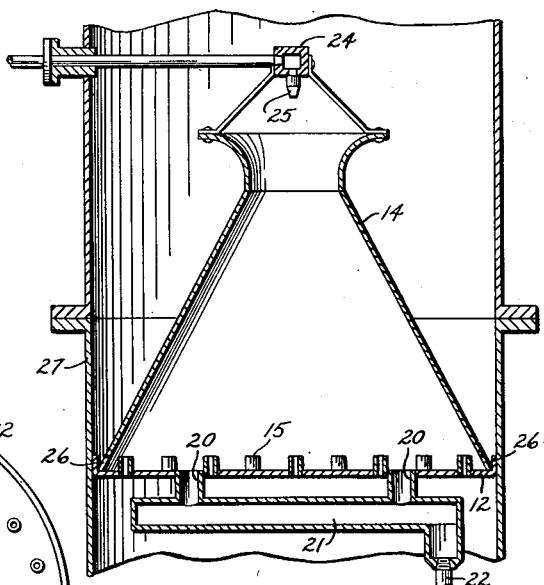
Fig. 2
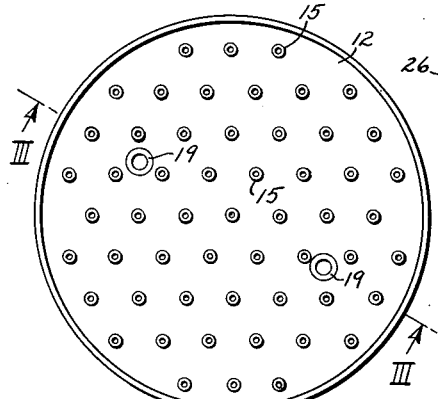
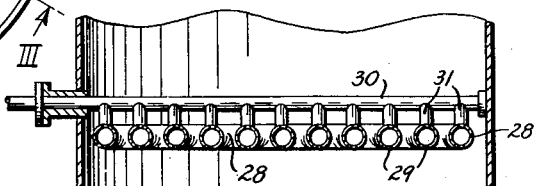
Fig. 3
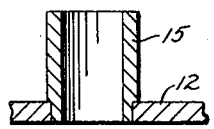
Fig. 4
Fig. 7
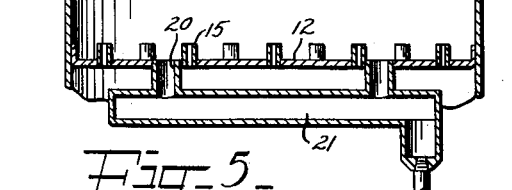
Fig. 5
INVENTOR.
THEODORE O. WENTWORTH
BY Thomas R. O'Malley
ATTORNEY.

Patented Oct. 18, 1949

2,484,918

UNITED STATES PATENT OFFICE 2,484,918

LIQUID-VAPOR CONTACT APPARATUS

Theodore O. Wentworth, Cincinnati, Ohio, assignor to The Vulcan Copper & Supply Company, Cincinnati, Ohio, a corporation of Ohio Continuation of application Serial No. 430,174, February 10, 1942. This application January 14, 1947, Serial No. 722,054

15 Claims. (Cl. 261—34)

This application is a continuation of my prior copending application Serial No. 430,174, filed February 10, 1942 (now abandoned). This invention primarily relates to an apparatus for obtaining intimate contact between a liquid stream and a vapor or gas stream and it is particularly concerned with an apparatus for the fractionation of constituents which have different boiling points. While the apparatus of this invention is applicable to the performance of numerous unit processes as will be more particularly pointed out hereinafter, a clear understanding of the invention may be readily conveyed by referring to its most important application in fractional distillation processes, and it will therefore be described hereinafter as a fractional distillation apparatus.

It is an object of the invention to provide an apparatus for obtaining intimate contact between a stream of liquid and a stream of vapor while maintaining conditions such as to assure substantial countercurrent flow of the vapor stream with respect to the liquid. Only by maintaining substantially countercurrent flow can the maximum efficiency of fractionation be obtained. It is a further object of the invention to impart to the liquid a condition in which it presents a high contact area for a given quantity thereof and to direct the vapor stream in countercurrent relation to the liquid in such a manner as to take full advantage of the large contact area offered by the liquid. It is a further object of the invention to provide for obtaining this countercurrent contact between the liquid stream and vapor stream through relatively long distances without encountering substantial differences in pressure in the vapor phase at the extremities of their contacting travel. Other objects of the invention will be apparent from the drawing and the description thereof hereinafter.

In the drawing illustrative of the invention,

Figure 1 is an elevation of one form of apparatus made in accordance with my invention, Figure 2 is a top view of one of the plates in the apparatus shown in Figure 1, Figure 3 is a detailed vertical section through one of the unit sections of the apparatus of Figure 1, Figure 4 is an enlarged vertical section through an element of the apparatus shown in Figure 1, Figure 5 is a detailed vertical section of a modified form of unit section, Figure 6 is a somewhat diagrammatic elevation of a modified form of apparatus, and Figure 7 is a vertical section, similar to Figure 4, through a modified form of element.

In the arrangement shown in Figure 1, wherein the apparatus is adapted for a batch or intermittent operation, the liquid to be fractionated, which is a physical mixture of two or more evaporable constituent compounds from which the more volatile fraction or constituent is to be separated, is introduced through an inlet 1 into the distilling section 2. While distillation could, of course, be maintained by direct application of heat to the outer surfaces of the distilling section 2 a more controlled application of heat to the liquid is preferred and for this purpose liquid is continuously withdrawn through the bottom outlet 3 and circulated by the centrifugal pump 4 through the valve 5 and the heat exchanger 6. Steam or other heating fluid passes through the pipe 7 into the shell 8 of the heat exchanger 6, the condensed steam or fluid running off through the pipe 9. In the heat exchanger the liquid to be distilled passes through the coil 10 in indirect heat exchange relationship to the steam or other heating fluid and is thereby completely or partially vaporized. The heating liquid and the vapors from the heat exchanger are discharged into the distilling section through the perforated header 11.

The vapors pass upwardly from the still 2 through the lowermost plate 12 (more particularly described hereinafter) into the fractionating portion 13 of the apparatus which is composed of a column containing a plurality of unit sections (three as shown in Figure 1) vertically superimposed with respect to each other, the effective portion of each section being defined generally by the channel 14. As shown in Figure 2, each of the plates 12 spans the interior of the cylindrical fractionating column 13 and carries uniformly distributed over its surface and extending upwardly therefrom a number of short tubes 15 which permit the vapors to rise above the plate 12 free of interference by any liquid layer upon the plate. If desired, the vapor tubes 15 may be provided with caps 16 as shown in Figure 7 where the tube or riser 15 terminates in U-band 17 to which the cap 16 is suitably secured as at 18.

The lowermost of these plates 12 is also provided with two overflow pipes 19 the lower ends of which are upturned as shown in Figure 1 to provide a trap in order to prevent vapors below this plate from interfering with the passage of the liquid through the pipes 19 back into the still 2. The entrance openings of the overflow pipes 19 are flush with the top surface of the plate so that any liquid falling upon the plate is substantially immediately drained to the still section 2 below.

Each of the plates 12 in all sections above the lowermost is provided with overflow pipes 20 communicating with a manifold 21 discharging through pipe 22 into its respective pump 23 by which it is sprayed into the next section below. The overflow pipes 20 are flush with the upper surface of the plate 12 so that any liquid falling upon the plate flows immediately into the manifold 21 therebelow.

As the vapor moves upwardly from any of the plates 12 through the channel 14, which confines it laterally to the general space occupied by the spray, it meets the descending spray of condensate from the plate in the section of the column next above. This spray is generated by forcing the condensate under pressure through a nozzle arrangement or other liquid-distributing device 24 located at the upper end of the channel 14. This nozzle arrangement is preferably similar to that used for every unit section in the column and is shown in greater detail in Figure 3. As there shown, a single nozzle 25 centrally disposed with respect to the upper opening of the channel 14 directs the spray downwardly in such a manner as to distribute the fine spray streams substantially uniformly in the space within the confining channel. Suitable small openings 26 may be provided at the bottom of the confining channel 14 to permit the passage of any condensate formed between the channel and the column shell 27 into the channels upon the top surfaces of the respective plates.

While only one spray nozzle 25 is shown in Figure 3, a plurality of such may be employed. In such event, the spray nozzles are preferably symmetrically disposed with respect to the channel 14 and the channel may be given any suitable shape to surround the spray and to assure maximum liquid-vapor contact by confining the rising vapors within the descending spray through substantially its entire height. As shown in the modification of Figure 5, this confining channel may take the form of, or it may be constituted of, the column shell itself and the spray means may be composed of numerous concentric pipes 28 with downwardly directed perforations or spray openings 29. These pipes are connected to the header 30 by the nipples 31. To obtain an efficient spray, the liquid must be delivered to the spray nozzle or nozzles or other liquid-distributing device under pressure and this is accomplished by one of the pumps 23 (Figure 1) discharging through a corresponding pipe 32 to the spray head 24 or spray header 30 respectively.

Each unit section of the fractionating column receives an upwardly ascending stream of vapor from the section next below and a downwardly directed spray of condensate from the section next above, the tubes 15 assuring substantially uniform distribution of the vapors with respect to each plate 12, and the confining channel 14 assuring that the vapors remain in contact with and in countercurrent flow with the spray throughout practically the entire height of the section. During such flow, the vapor and liquid streams come into intimate contact, the spray giving rise to a certain amount of mist which increases the liquid surface contacting the vapor stream and accelerating the desired molecular interchange involving simultaneous condensation of the higher boiling constituent of the vapor phase and evaporation of the lower boiling constituent of the liquid phase. The vapor ascending from the lowermost unit section of the fractionating column is proportionately richer than that entering this section with respect to the low-boiling constituent and ascends through the vapor risers or tubes 15 into the next section of the column, whereby the vapors are redistributed for fresh contact with the next liquid spray above. As in the lowest spray section of the column, each other spray section is provided with a confining channel 14 which may be similar in construction to that of the first section, or which may be different to conform with a different arrangement of nozzles or other liquid-distributing device, as may be desired.

The vapor proceeds in succession through each of the sections thereabove and finally reaches the top of the column where it is withdrawn by means of the vapor duct 33 to a condenser 34 within which the vapor is condensed. A part of this overhead distillate is sent to storage by means of the pipe 35 and the remainder is returned to the column through the topmost pump 23 and its spray head 24. The condenser is provided with a coil 36 or other heat-transferring element through which cold water or other cooling medium is forced, entering by pipe 37 and flowing out through pipe 38. As will be explained more fully hereinafter, the apparatus is particularly adapted for vacuum distillation and in such case a vacuum pump is connected to the condenser chamber by means of pipe 39 in order to draw the vapors coming from the distillation column into the condenser and to maintain the desired low absolute pressure within the column.

Whereas only three spray sections are shown in Figure 1, any number of such sections may be employed. In operating the apparatus in accordance with the batch system, a portion of the condensate from the vapor withdrawn from the top of the column is returned to the topmost spray section and the liquid descending upon each plate in the individual spray sections within the column is forced by a suitable pump into the spray head of the next spray section therebelow, in this manner providing a continuous active spray substantially throughout the length of the column flowing in substantially countercurrent relationship with respect to the rising vapors which are redistributed by means of the tubes or risers in the several plates and are confined to the spray by means of the confining channels in the respective sections.

Figure 6 illustrates the operation of the apparatus for continuous distillation. In such operation, the liquid mixture to be distilled may be introduced directly into the top spray section or into any intermediate spray section of the column. As shown in Figure 6, the liquid is introduced by pump 40 into the top spray head. In those cases where the feed is through an intermediate spray head, some of the overhead distillate must be returned to the topmost spray head to serve as reflux liquid for the rectifying section of the apparatus above the point of feed introduction. The heat necessary to volatilize the low boiling ingredients of the mixture may be introduced into the system by means of the heating coil 41; alternatively, some or all of it may be introduced by passing the liquid feed through a heat interchanger just prior to introduction into the column, or by direct introduction of steam in those cases where the least volatile material to be separated is water. There may also be special cases in which a mixture of the least volatile produce of the separation with water is not objectionable and which therefore permit the direct introduction of steam as the heating medium. The vapor outlet 33 leads the vapor from the dome of the column into the condenser 34 where the low boiling constituent of the liquid mixture originally fed into the column is condensed and obtained as one of the products. A vacuum pump 42 may be employed to withdraw the vapors from the column into the condenser and to maintain a vacuum within the system. Pumps are provided for forcing the overflow from each plate through the spray nozzles of each lower section. The high-boiling constituent of the liquid feed is obtained at the bottom of the column and is withdrawn through the bottom discharge pipe. Vapor-liquid interchange occurs in each of the spray sections of the column so that the vapor as it rises within the column becomes progressively richer in the low-boiling constituent while the liquid as it descents becomes progressively richer in the high-boiling constituent until substantially complete separation occurs at the two extreme ends of the column.

The vapor-liquid contact provided by the sprays in the several sections of the column makes it possible to obtain a highly efficient molecular interchange between the vapor and the liquid and, at the same time, makes it possible to maintain a high degree of vacuum within the entire column. Distillations may be performed in this column in which a pressure as low as from 1 to 3 millimeters of mercury absolete can be maintained throughout the length of such a column having as many as 6 or 7 or even more spray sections averaging about three feet lengths for each section, the difference in pressure between the bottom and top of the column being held to as low as one millimeter of pressure. This difference in pressure between the top and bottom of the column is caused substantially only by the vapor head combined with entrance and exit pressure losses through the vapor nozzles which uniformly redistribute the vapor stream at the entrance to each spray chamber. By proper design these entrance and exit losses may be maintained at a negligible order of magnitude. The numerous vapor tubes or risers which provide passage of the vapor through each of the several plates at the bottom of the respective spray sections, and the fact that the overflow pipes are flush with the upper surface of the respective plates assures that no liquid column wil be built up which can oppose the maintenance of low differential pressure between the top and bottom of the column.

This apparatus may be put to use in fractionally distilling many products, particularly liquid mixtures which contain a liquid or dissolved or suspended solid constituent which decomposes when distillation at ordinary pressures is attempted. For example, aqueous ethyl acetate solutions may be subjected to fractional distillation at considerably reduced pressures relative to atmospheric pressure. When distilled, such a solution yields an azeotropic, or constant boiling mixture of ethyl acetate with water; said azetrope having a boiling point of approximately 70° C. at atmospheric pressure. When an aqueous solution of ethyl acetate is distilled at substantially atmospheric pressure in the usual type of distilling column, a temperature range will prevail from 70° C. minimum at the top to a temperature in excess of 100° C. at the base (depending on the absolute pressure at the base of the column). Within this temperature range an appreciable part of the ethyl acetate undergoes hydrolytic decomposition in presence of water. By distilling the aqueous ethyl acetate in the apparatus of this invention at absolute pressures considerably below atmospheric and thus reducing the boiling point of the azeotrope and the boiling temperatures throughout the apparatus, it has been found possible to reduce the loss of ethyl acetate by hydrolysis to a negligible point; the lower the absolute pressure employed, the lower the loss sustained. It so happens that the reduction of pressure is also of advantage in this particular distillation in that the azeotrope obtained at lower pressures contains a reduced proportion of water thus reducing the quantity of steam required for the separation. Such apparatus may also be applied to the treatment of fermentable mashes, such as grain mash, which contains suspended solid material which is decomposable at the distillation temperatures corresponding to ordinary pressures. The apparatus of the invention also finds valuable application in the fractionation of compounds which tend to polymerize or decompose when attempts are made to distill them at ordinary pressures. By taking full advantage of the high vacuum obtainable during distillation in the apparatus of the invention, it has been found possible to fractionate materials which have never been fractionated by distillation heretofore because of their strong tendency to polymerize. As stated above, the invention makes possible commercial fractionation at pressures as low as one millimeter of mercury at the base of the column.

While the apparatus has been described in connection with distillation processes, it may also be employed wherever intimate contact between a gas and a liquid is desired. For example, it may be employed for selective absorption of certain constituents from a mixture of gases by means of a liquid which has solvent properties for the particular gas to be absorbed. In this connection, the gas from which certain constituents are to be absorbed is introduced at the base of the column and the liquid may be introduced at the top, overflowing the plates and being forced into the spray heads of each spray section of the column in succession from the top down. For this operation, the apparatus has the advantage that relatively low gas pressures need be employed to obtain intimate contact with a large amount of liquid. It may be used in air conditioning processes in other processes involving heat interchange, molecular interchange between a liquid and a gas or vapor, or the selective solvent action of a liquid upon a gas or vapor.

While preferred embodiments of the invention have been described, the description is intended to be illustrative only, and it is to be understood that changes and variations may be made without departing from the spirit and scope of the invention as defined by the appended claims.

I claim:

1. In apparatus for contacting gas or vapor with liquid having a plurality of sections, means for spraying a liquid in each of said sections, means for passing a gas or vapor in succession through each of said sections counter-current to the sprays, means for substantially confining the gas or vapor laterally to the space traversed by the sprays, means for withdrawing the entire body of the spray liquid from each section at the end of the travel therethrough, and pump means for directing the liquid withdrawn from each section except the last through the spray means of the next section.

2. In apparatus for contacting vapor with liquid having a plurality of sections, means for spraying a liquid in each of said sections, means for passing a vapor in succession through each of said sections counter-current to the sprays, means for substantially confining the vapor laterally to the space traversed by sprays, means for withdrawing the entire body of the spray liquid from each section at the end of the travel therethrough, and pump means for directing the liquid withdrawn from each section except the lowermost through the spray means of the next section below.

3. Fractional distillation apparatus having a plurality of vertically superimposed vapor-liquid contact sections, means for spraying a liquid in each of said sections, means for passing a vapor upwardly through said sections countercurrent to said sprays, means for distributing said vapor generally through the transverse area of each section as it enters, means for substantially confining the vapor laterally to the space in each section traversed by the corresponding spray, means for withdrawing the entire body of the spray liquid from each section at the end of its travel therethrough, and pump means for directing the liquid withdrawn from each section except the lowermost through the spray means of the next section below.

4. In apparatus for contacting gas or vapor with liquid having a plurality of sections, means for spraying a liquid in each of said sections, means for passing a gas or vapor in succession through each of said sections countercurrent to the sprays, means for distributing said gas or vapor generally through the transverse area of each section as it enters, means for substantially confining the gas or vapor laterally to the space traversed by the sprays, means for withdrawing the entire body of the spray liquid from each section at the end of the travel therethrough, said liquid-withdrawing means being constructed and arranged to prevent retention of liquid adjacent the end of the section, and pump means for directing the liquid withdrawn from each section except the last through the spray means of the next section.

5. Fractional distillation apparatus having a plurality of vertically superimposed vapor-liquid contact sections, means for spraying a liquid in each of said sections, means for passing a vapor upwardly through said sections countercurrent to said sprays, means for distributing said vapor throughout the transverse area of each section as it enters, means for substantially confining the vapor laterally to the space in each section traversed by the corresponding spray, means for withdrawing the entire body of the spray liquid from each section at the end of the travel therethrough, said liquid-withdrawing means being constructed and arranged to prevent retention of liquid adjacent the end of the section, and pump means for directing the liquid withdrawn from each section except the lowermost through the spray means of the next section below.

6. Apparatus in accordance with claim 5 in which each of the vapor-liquid contact sections is of generally conical shape.

7. Apparatus in accordance with claim 5 provided with means whereby a vacuum may be maintained in said plurality of sections.

8. Fractional distillation apparatus having a plurality of vertically superimposed vapor-liquid contact sections, means for spraying a liquid in each of said sections, a plate at the bottom of each section, liquid overflow means having an effective discharge opening substantially flush with the top surface of each of said plates, means associated with each of said plates substantially uniformly distributed with respect thereto for introducing vapor from the region therebelow into their respective sections above the level of any liquid layer therein, and pump means connected to the overflow means of each section except the lowermost for forcing the overflow into the spray means of the next section below.

9. In apparatus for contacting vapor with liquid having a plurality of sections, means comprising a stationary spray head for spraying a liquid in each of said sections, means for passing a vapor in succession through each of said sections countercurrent to the sprays, means for substantially confining the vapor laterally to the space traversed by the sprays, means for withdrawing the entire body of the spray liquid from each section at the end of the travel therethrough, and pump means for directing the liquid withdrawn from each section except the last through the spray means of the next section.

10. Fractional distillation apparatus having a plurality of vertically superimposed vapor-liquid contact sections, means for spraying a liquid in each of said sections, a plate at the bottom of each section, liquid overflow means having an effective discharge opening flush with the top surface of each of said plates, vapor-riser tubes substantially uniformly distributed on each of said plates opening into their respective sections above the level of any liquid layer therein for introducing vapor into their respective sections from the region therebelow, and means associated with the overflow means of each section except the lowermost for forcing the overflow into the spray means of the next section below.

11. In apparatus for contacting gas or vapor with liquid having a plurality of sections, means comprising a stationary sprayhead for spraying a liquid in each of said sections, means for passing a gas or vapor in succession through each of said sections countercurrent to the sprays, means for distributing said gas or vapor generally through the transverse area of each section as it enters, means for substantially confining the gas or vapor laterally to the space traversed by the sprays, means for withdrawing the entire body of the spray liquid from each section at the end of the travel therethrough, pump means for directing the liquid withdrawn from each section except the last through the spray means of the next section, and means for reducing the pressure below atmospheric throughout the plurality of sections.

12. Fractional distillation apparatus having a plurality of vapor-liquid contact sections disposed at different levels, means for spraying a liquid in each of said sections, a plate at the bottom of each section, liquid overflow means having an effective discharge opening flush with the top surface of each of said plates, means associated with each of said plates for introducing vapor from the region therebelow into their respective sections above the level of any liquid layer therein, and pump means connected to the overflow means of each section except the lowermost for forcing the overflow into the spray means of the next section below.

13. Fractional distillation apparatus having a plurality of vertically superimposed vapor-liquid contact sections, means for spraying a liquid in each of said sections, a plate at the bottom of each section, liquid overflow means having an effective discharge opening flush with the top surface of each of said plates, means associated with each of said plates substantially uniformly distributed with respect thereto for introducing vapor from the region therebelow into their respective sections above the level of any liquid layer therein, and pump means connected to the overflow means of each section except the lowermost for forcing the overflow into the spray means of the next section below.

14. Fractional distillation apparatus having a plurality of vapor-liquid contact sections disposed at different levels, means for spraying a liquid in each of said sections, a plate at the bottom of each section, liquid overflow means having an effective discharge opening flush with the top surface of each of said plates, means associated with each of said plates for introducing vapor from the region therebelow into their respective sections above the level of any liquid layer therein, and pump means connected to the overflow means of each section except the lowermost for forcing the overflow into the spray means of the next section below.

15. Apparatus in accordance with claim 4 in which each of the spray means comprises a stationary spray head.

THEODORE O. WENTWORTH.

REFERENCES CITED

The following references are of record in the file of this patent:

UNITED STATES PATENTS

| Number | Name | Date |
|---|---|---|
| 1,797,271 | McKee | Mar. 24, 1931 |
| 1,876,179 | Tindall | Sept. 6, 1932 |

FOREIGN PATENTS

| Number | Country | Date |
|---|---|---|
| 551,359 | Germany | May 30, 1932 |
| 120,304 | Great Britain | Nov. 7, 1918 |
| 2,650 | Austria | Nov. 10, 1900 |

Certificate of Correction

Patent No. 2,484,918                                                  October 18, 1949

THEODORE O. WENTWORTH

It is hereby certified that errors appear in the printed specification of the above numbered patent requiring correction as follows:

Column 2, line 23, for the word "heating" read *heated*; column 4, line 72, for "produce" read *product*;

and that the said Letters Patent should be read with these corrections therein that the same may conform to the record of the case in the Patent Office.

Signed and sealed this 14th day of February, A. D. 1950.

[SEAL]

THOMAS F. MURPHY,
*Assistant Commissioner of Patents.*